(12) United States Patent
Rumpf

(10) Patent No.: US 7,651,784 B2
(45) Date of Patent: Jan. 26, 2010

(54) SLIDING ELEMENT

(75) Inventor: Thomas Rumpf, Gmunden (AT)

(73) Assignee: Miba Gleitlager GmbH, Laakirchen (AT)

( * ) Notice: Subject to any disclaimer, the term of this patent is extended or adjusted under 35 U.S.C. 154(b) by 473 days.

(21) Appl. No.: 11/728,987

(22) Filed: Mar. 27, 2007

(65) Prior Publication Data

US 2007/0269147 A1 Nov. 22, 2007

(30) Foreign Application Priority Data

Mar. 30, 2006 (AT) .............................. A 551/2006

(51) Int. Cl.
*F16C 33/06* (2006.01)
*C25D 7/10* (2006.01)
*B32B 15/01* (2006.01)

(52) U.S. Cl. ...................... 428/642; 428/935; 205/261; 384/912

(58) Field of Classification Search ........................ None
See application file for complete search history.

(56) References Cited

U.S. PATENT DOCUMENTS

| | | | |
|---|---|---|---|
| 5,342,698 A | 8/1994 | Fujisawa et al. | |
| 6,309,759 B1 | 10/2001 | Tomikawa et al. | |
| 7,063,897 B2 * | 6/2006 | Kawachi et al. | ............. 428/642 |
| 2002/0031684 A1 | 3/2002 | Niegel et al. | |
| 2004/0202887 A1 | 10/2004 | Kawachi et al. | |
| 2004/0241489 A1 | 12/2004 | Kawachi et al. | |
| 2006/0216539 A1 * | 9/2006 | Takayanagi et al. | ......... 428/642 |
| 2008/0102307 A1 * | 5/2008 | Zidar | ........................ 428/640 |

FOREIGN PATENT DOCUMENTS

| | | |
|---|---|---|
| DE | 100 32 624 A1 | 4/2001 |
| DE | 10 2004 015 827 A1 | 11/2004 |

* cited by examiner

*Primary Examiner*—John J Zimmerman
(74) *Attorney, Agent, or Firm*—Collard & Roe, P.C.

(57) ABSTRACT

The invention describes a sliding element, in particular a sliding bearing, with a support element and a sliding layer, between which a bearing metal layer is arranged, wherein the sliding layer is made from bismuth or a bismuth alloy, and wherein the crystallites of the bismuth or the bismuth alloy in the sliding layer adopt a preferred direction with respect to their orientation, expressed by the Miller index of the lattice plane (012), wherein the X-ray diffraction intensity of the lattice plane (012) is the greatest compared to the X-ray diffraction intensities of other lattice planes. The X-ray diffraction intensity of the lattice plane with the second-largest X-ray diffraction intensity is a maximum of 10% of the X-ray diffraction intensity of the lattice plane (012).

6 Claims, 4 Drawing Sheets

SLIDING ELEMENT

CROSS REFERENCE TO RELATED APPLICATIONS

Applicant claims priority under 35 U.S.C. §119 of AUSTRIAN Patent Application No. A 551/2006 filed on Mar. 30, 2006.

BACKGROUND OF THE INVENTION

1. Field of the Invention

The invention relates to a sliding element with a support element and a sliding layer, between which a bearing metal layer is arranged, wherein the sliding layer is made from bismuth or a bismuth alloy and wherein the crystallites of the bismuth or the bismuth alloy in the sliding layer adopt a preferred direction with respect to their orientation, expressed by the Miller index of the lattice plane (012), wherein the X-ray diffraction intensity of the lattice plane (012) is the greatest compared to the X-ray diffraction intensity of the other lattice planes, and a method for its production.

2. Prior Art

Sliding bearings are characterised inter alia in that they have a relatively soft sliding layer in order to allow for adjustment to the supported element, for example a shaft, and to a certain degree to enable foreign particles to become embedded. In order to provide these tribological properties so far mainly sliding bearings containing tin or lead have been proposed in the prior art. However, lead is undesirable due to its toxicity and, particularly recently, increasing attempts have been made to find ways of eliminating lead.

Thus in DE 100 32 624 A a sliding bearing was proposed which comprises a bearing metal and a running layer made of bismuth or a bismuth alloy formed on the bearing metal, wherein the relative ratio of the X-ray diffraction intensity $I_{[hkl]}$ of the running layer made of bismuth or a bismuth alloy defined below satisfies the following conditions (a) and (b):

(a) the relative ratio of the X-ray diffraction intensity $I_{[hkl]}$ of other planes than {012} is 0.2 to 5 times as high as the ratio of the X-ray diffraction intensity $I_{[012]}$, i.e. $0.2 I_{[012]} \leq I_{[hkl]} \leq 5 I_{[012]}$;

(b) the relative ratio of the X-ray diffraction intensity $I_{[hkl]}$ of three or more other planes than {012} falls within a range which is 0.5 to 2 times as high as the relative ratio of the X-ray diffraction intensity $I_{[012]}$, i.e. $0.5 I_{[012]} \leq I_{[hkl]} \leq I_{[012]}$, wherein the {hkl}-planes of bismuth crystals of standard powder samples, which have a random orientation, show the X-ray diffraction intensity $R_p(hkl)$; {hkl}-planes of bismuth crystals of the running layer made of bismuth or a bismuth alloy show the X-ray diffraction intensity $R_{O/L}(hkl)$; the ratio of the two intensities is expressed by $K(hkl)=R_{O/L}(hkl)R_p(hkl)$; the ratio of K(012) and K(hkl) is expressed by $I[hkl]=K(hkl)/K(012)$.

Furthermore, from DE 10 2004 015 827 A a sliding element is known which comprises a rear metal layer, a sliding alloy layer provided on the rear metal layer and a cover layer provided on the sliding alloy layer, wherein the cover layer is made from bismuth or a bismuth alloy, and wherein in a crystal lattice of the cover layer a surface defined by Miller index (202) has a degree of orientation, which is not lower than 30%, and the X-ray diffraction intensity $R_{(202)}$ of the (202)-surface has a maximum value in comparison to other surfaces.

SUMMARY OF THE INVENTION

The objective of the present invention is to provide a sliding element with a lead-free sliding layer.

This objective is achieved in that with the aforementioned sliding element the X-ray diffraction intensity of the lattice plane with the second largest X-ray diffraction intensity is a maximum of 10% of the X-ray diffraction intensity of the lattice plane (012), and independently in that in the method according to the invention the sliding layer is produced according to these features.

It has been established surprisingly that a sliding element with the sliding layer according to the invention made of bismuth or a bismuth alloy—unlike the interpretation represented in DE 10 2004 015 827 A1—with bismuth or bismuth alloy crystallites aligned in this way shows at least comparable properties to the sliding layer according to DE 10 2004 015 827 A1. This result is also surprising with respect to DE 100 32 624 A, according to which bismuth sliding layers of this kind are only suitable if the preferred orientation is not restricted to a few specific planes, as is the case according to the invention.

In addition to being lead-free the main advantage of the sliding layer according to the invention is that it is easy to produce. This strong orientation according to the (012) plane is achieved for example by galvanic precipitation. There is no need for example, as proposed in DE 10 2004 015 827 A1, to work with reversing periods in a specific operating cycle. The sliding element according to the invention also has improved wearing resistance due to the strong orientation of the crystallites.

According to one embodiment variant the lattice plane with the second highest X-ray diffraction intensity is the one with the Miller index (024). In this way a greater degree of orientation of the crystallites in the sliding layer is achieved whereby the above properties are further improved.

The sum of the X-ray diffraction intensities of all other lattice planes different from lattice plane (012) preferably is a maximum of 25% of the X-ray diffraction intensity of the lattice plane (012), whereby a greater degree of orientation is also achieved.

It is also advantageous if the sliding layer has Vickers hardness selected from a range with a lower limit of 15 HV and an upper limit of 40 HV, by means of which the wearing resistance is improved. For example, the sliding layer can have a hardness of 20 HV or 25 HV or 30 HV or 35 HV.

The sliding layer can have a thickness selected from a range with a lower limit of 5 µm and an upper limit of 40 µm, in order to obtain improved antiseizing properties for the sliding element. For example, the sliding layer can have a thickness of 10 µm or 15 µm or 20 µm or 25 µm or 30 µm or 35 µm.

BRIEF DESCRIPTION OF THE DRAWINGS

For a better understanding of the invention the latter is explained in more detail by means of the following figures.

DETAILED DESCRIPTION OF PREFERRED EMBODIMENTS

Figure 1:
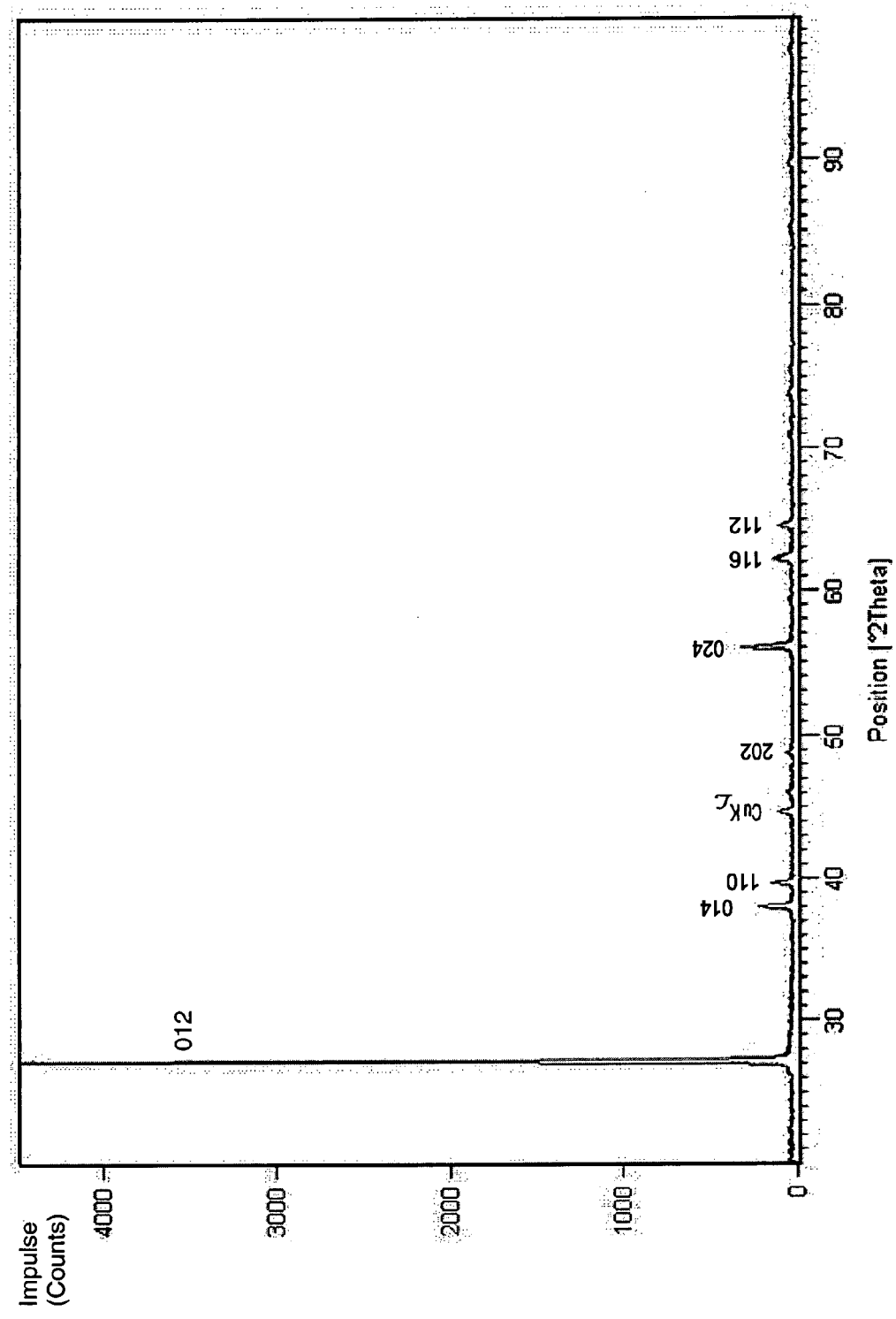
FIG. 1 shows a view of the X-ray diffraction pattern of the surface of the sliding layer according to the invention made of Bi at a current density of 5 A/dm² (ASD) during the precipitation.

Firstly, it should be noted that the details on position used in the description, such as e.g. top, bottom, side etc. relate to the embodiment variant being described at the time, and if there is a change in position should be transposed to the new position. Furthermore, individual features or combinations of features from the various embodiments described can represent in themselves independent solutions according to the invention.

A sliding element according to the invention consists, as already known, of a support element, which can be a steel protection shell for example, a bearing metal layer arranged thereon, and a sliding layer according to the invention arranged on the latter made of bismuth or a bismuth alloy.

The bearing metal layer can be any known bearing metal layer, for example an aluminium-tin alloy, a copper alloy or an aluminium alloy etc.

Possible examples are:

1. Bearing metals with an aluminium base (according to DIN ISO 4381 or 4383):
   AlSn6CuNi, AlSn20Cu, AlSi4Cd, AlCd3CuNi, AlSi11Cu, AlSn6Cu, AlSn40, AlSn25CuMn, AlSi11CuMgNi;

2. Bearing metals with a copper base (according to DIN ISO 4383):
   CuSn10, CuAl10Fe5Ni5, CuZn31Si1, CuPb24Sn2, CuSn8Bi10;

3. Bearing metals with a tin base:
   SnSb8Cu4, SnSb12Cu6Pb.

Of course, other bearing metals can be used than those mentioned with a base of aluminium, copper or tin.

The sliding layer is, as already mentioned, formed from the layer of bismuth or a bismuth alloy according to the invention, wherein the alloy partner for bismuth can be at least one element from a group comprising copper, silver, tin, antinomy and indium in a proportion of a maximum of 10 wt. %. The proportion of the at least one alloy element can be selected from a range with a lower limit of 1 wt. % and an upper limit of 9 wt. % or from a range with a lower limit of 3 wt. % and an upper limit of 7 wt. %. Thus for example alloys of bismuth with two or four or six or eight wt. % of at least one of these alloy partners are possible. In a preferred embodiment variant the proportion of added alloy elements is a maximum of 10 wt. %. It is thus possible for example that the alloy contains 3 wt. % Sn and 2 wt. % Sb or 4 wt. % Sn and 2 wt. % In. Other alloy compositions are also possible within the limits of the given ranges as long as the above prerequisite of the orientation of the crystallites is satisfied.

In addition to the three-layered structure of the sliding element a multi-layered embodiment is also possible. For example, between the support element and the bearing metal layer and/or between the bearing metal layer and the sliding layer a diffusion barrier layer and/or bonding layer can be arranged. For such layers e.g. Al, Mn, Ni, Fe, Cr, Co, Cu, Ag, Mo, Pd as well as NiSn or CuSn alloys can be used.

The sliding element within the meaning of the invention is defined as any type of sliding bearing such as e.g. a sliding bearing, for example a sliding bearing half shell or full shell in the form of bush, a thrust ring, bearings in driving technology, e.g. for connecting rods, guides or the like.

It is also possible however to apply the sliding payer directly onto a corresponding element, i.e. to perform direct coating, so that an additional component is not necessary for the sliding bearing. This is possible with connecting rods for example.

The sliding layer according to the invention was produced galvanically, whereby the bath has the following composition and the coating was carried out with the following parameters.

Example 1

Bath Composition for the Galvanic Precipitation 50 g/l Bi as methane sulphonate 80 g/l methane sulphonic acid to improve conductivity Addition of smoothing agent and at least one tenside.
Operating Data:

Room temperature

Figure 2:
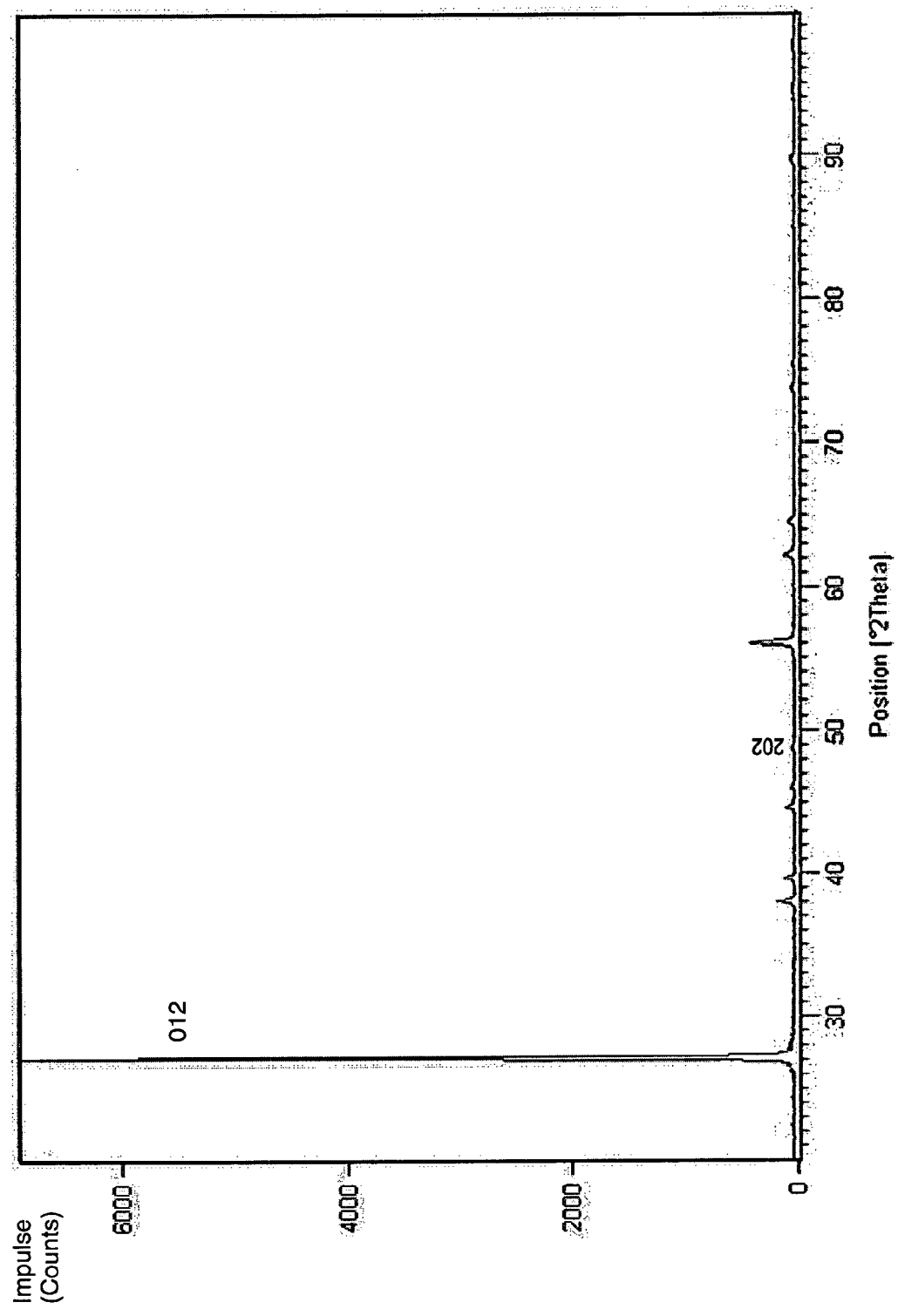
FIG. 2 shows a view of the X-ray diffraction pattern of the surface of the sliding layer according to the invention made of Bi at a current density of 10 A/dm² (ASD) during the precipitation.
Figure 3:
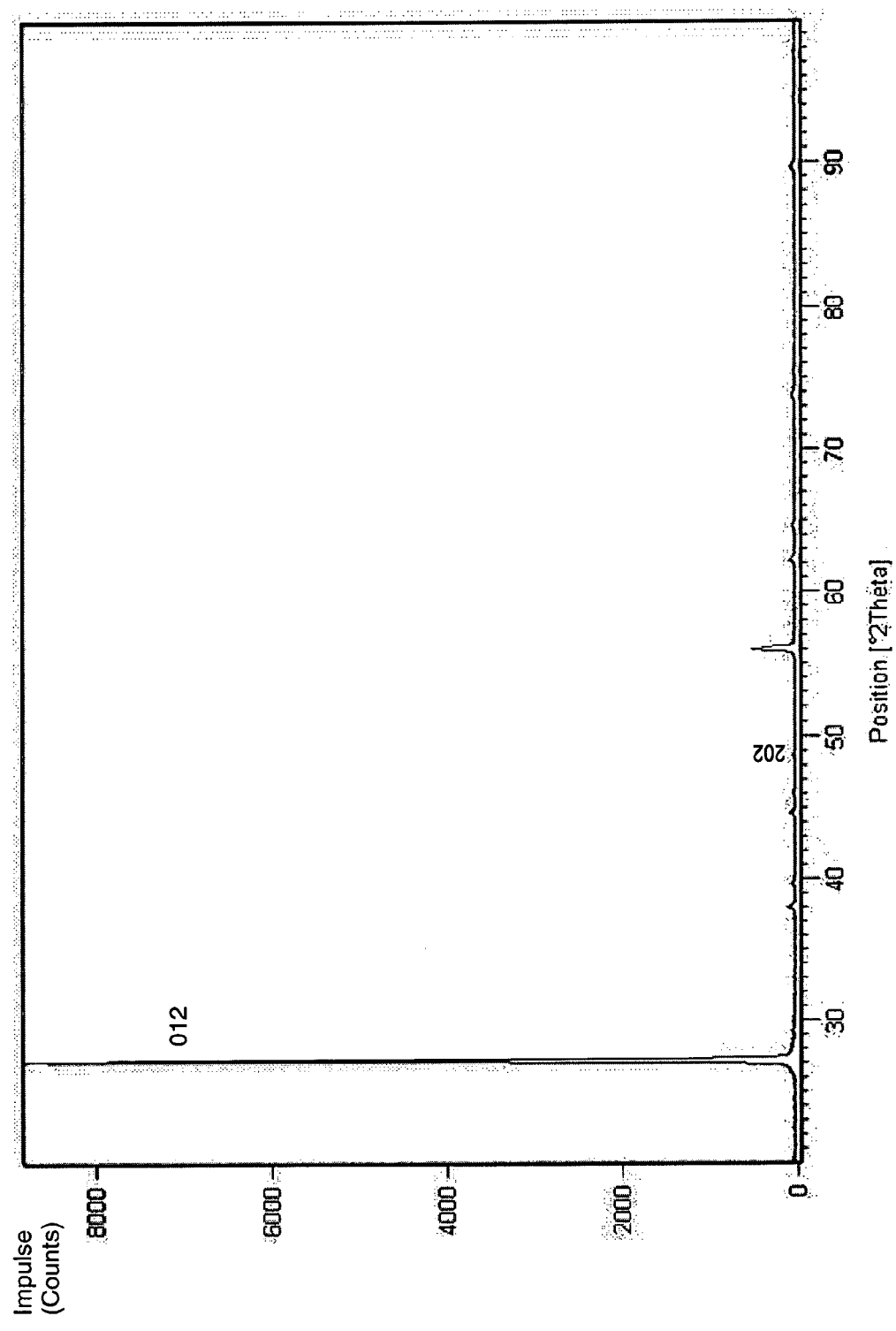
FIG. 3 shows a view of the X-ray diffraction pattern of the surface of the sliding layer according to the invention made of Bi at a current density of 15 A/dm² (ASD) during the precipitation.

Current density: 5 A/dm$^2$ (FIG. 1) or 10 A/dm$^2$ (FIG. 2) or 15 A/dm$^2$ (FIG. 3)

Example 2

Bath Composition for the Galvanic Precipitation 70 g/l Bi as methane sulphonate 50 g/l methane sulphonic acid to improve conductivity 1 g/l commercially available tenside for improving wettability 0.5 g/l layer smoothing additive ("leveller")
Operating Data:

Room temperature

Current density: 5 A/dm$^2$

Of the sliding layers produced X-ray diffraction diagrams were then recorded which are shown in FIGS. 1 to 3. The corresponding intensities for FIG. 1 are given in Table 1.

| Plane | Intensity |
|-------|-----------|
| 012   | 4561      |
| 014   | 223       |
| 110   | 161       |
| 202   | 82        |
| 024   | 339       |
| 116   | 178       |
| 112   | 125       |

The readout corresponds to a standard readout, whereby on the x-axis the °2 theta values are entered and on the y-axis the impulses (counts) are entered. The readout was produced by a camera and CuKα-radiation was used.

As shown from the comparison of the three diagrams according to FIGS. 1 to 3, with an increase in the current density during the precipitation the 012 plane comes more clearly into the foreground, i.e. by increasing the current density the degree of orientation in the layer is increased further.

The material according to the invention, i.e. the bismuth layer according to the invention, in this embodiment, was compared with sliding layers known from the aforementioned documents of the prior art. Out of six sliding layer patterns, 5 of which were pure bismuth and a sample of a bismuth alloy with 3 wt. % tin, the surface pressure was determined from which a so-called seizing of the shaft occurs. For the six samples this was between 95 MPa and 110 MPa in the region of the values disclosed in DE 100 32 624 A. Compared with the bearings according to DE 10 2004 015 827 A the bearings according to the invention proved to be much better. The method given in DE 100 32 624 A was used for the measurement. The thickness of the sliding layer was selected in each case to be 10 μm.

For a Bi-sliding layer according to the invention the hardness was defined as 17 UMHV 2 gf and for a BiCu10 sliding layer as 30 UMHV 5 gf. UMHV stands for ultra-microhardness Vickers at 2 gram-force or 5 gram-force loading.

Figure 4:
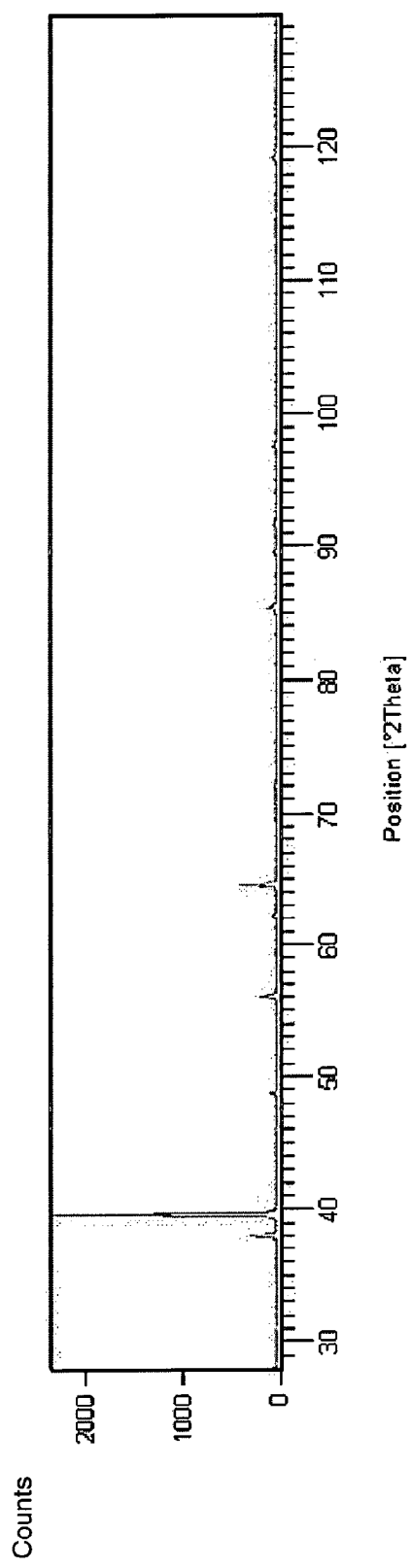
FIG. 4 shows a view of the X-ray diffraction pattern of the surface of the sliding layer according to the invention made from a Bi-alloy with 8 wt. % Sn.

Lastly, FIG. 4 shows an example of a sliding layer according to the invention made from a bismuth alloy with 8 wt. % tin. Here too the alignment in the layer according to the (012) plane is clearly identified.

All of the details relating to value ranges in the present description are such that they also include any and all subranges. For example, the specification 1 to 10 means that all subranges are included, starting from the lower limit of 1 to the upper limit of 10, i.e. the complete subrange begins at a lower limit of 1 or more and ends at an upper limit of 10 or less, e.g. 1 to 1.7 or 3.2 to 8.1 or 5.5 to 10.

The embodiment describes a possible embodiment of the sliding element, whereby it is noted at this point that the invention is not restricted to the specifically shown embodiment variant.

The objective of the independent solutions according to the invention can be taken from the description.

What is claimed is:

1. Sliding element, in particular sliding bearing, with a support element and a sliding layer, between which a bearing metal layer is arranged, wherein the sliding layer is made from bismuth or a bismuth alloy, and wherein the crystallites of the bismuth or the bismuth alloy in the sliding layer adopt a preferred direction with respect to their orientation, expressed by the Miller index of the lattice plane (012), wherein the X-ray diffraction intensity of the lattice plane (012) is the greatest in comparison with the X-ray diffraction intensities of other lattice planes, wherein the X-ray diffraction intensity of the lattice plane with second largest X-ray diffraction intensity is a maximum of 10% of the X-ray diffraction intensity of the lattice plane (012).

2. Sliding element according to claim 1, wherein the lattice plane with the second-highest X-ray diffraction intensity is the one with the Miller index (024).

3. Sliding element according to claim 1, wherein the sum of the X-ray diffraction intensities of all other lattice planes different from lattice plane (012) is a maximum of 25% of the X-ray diffraction intensity of the lattice plane (012).

4. Sliding element according to claim 1, wherein the sliding layer has a Vickers hardness selected from a range with a lower limit of 15 HV and an upper limit of 40 HV.

5. Sliding element according to claim 1, wherein the sliding layer has a layer thickness selected from a range with a lower limit of 5 μm and an upper limit 40 μm.

6. Method for producing a sliding element comprising at least one support layer, a bearing metal layer and a sliding layer, according to which on the support element, the bearing metal layer, if necessary with the intermediate arrangement of a bonding layer, and on the bearing metal layer the sliding layer, if necessary with intermediate arrangement of a bonding layer, are arranged, wherein the sliding layer is precipitated galvanically from a methane sulphonic acid solution of a bismuth salt on the bearing metal layer or the bonding layer, wherein the sliding layer is produced according to claim 1.

* * * * *